G. E. CURTISS.
TEA OR COFFEE POT.
APPLICATION FILED FEB. 15, 1909.
954,502.
Patented Apr. 12, 1910.
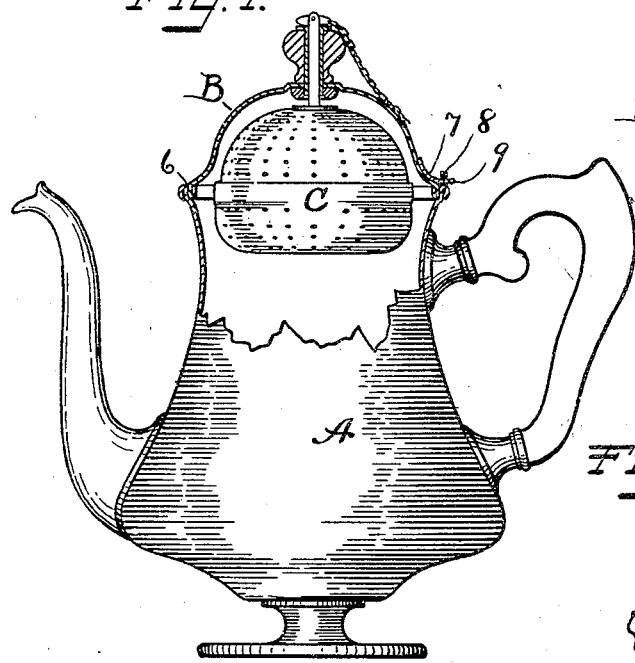
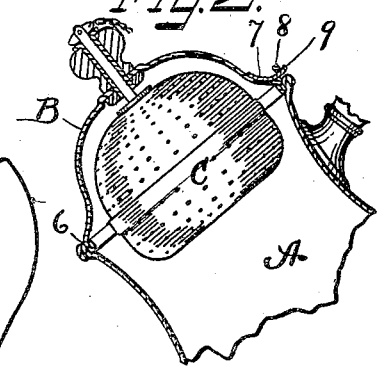
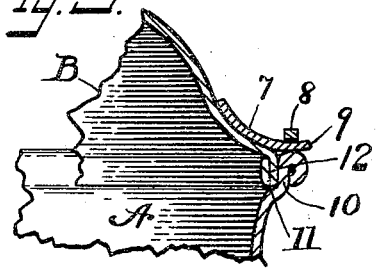
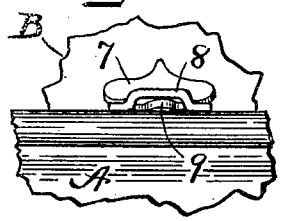
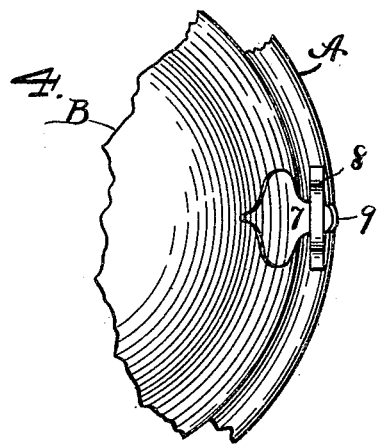
Witnesses.
S. H. Clarke
James Shepard
Inventor.
George E. Curtiss.
By Louis M. Schmidt
Atty.

UNITED STATES PATENT OFFICE.

GEORGE E. CURTISS, OF NEW BRITAIN, CONNECTICUT, ASSIGNOR TO LANDERS, FRARY AND CLARK, OF NEW BRITAIN, CONNECTICUT, A CORPORATION.

TEA OR COFFEE POT.

954,502.

Specification of Letters Patent. Patented Apr. 12, 1910.

Application filed February 15, 1909. Serial No. 477,872.

*To all whom it may concern:*

Be it known that I, GEORGE E. CURTISS, a citizen of the United States, residing at New Britain, in the county of Hartford and State of Connecticut, have invented certain new and useful Improvements in Tea or Coffee Pots, of which the following is a specification.

My invention relates to improvements in tea or coffee pots and the objects of my improvements are convenience in use, particularly with reference to maintaining the cover in position in the type of tea or coffee pot provided with a tea ball.
In the accompanying drawings:—Figure 1 is a central vertical section of my improved tea or coffee pot. Fig. 2 is a similar view of the cover and part of the tea or coffee pot showing the same in an inclined position for pouring. Fig. 3 is a similar detached view, on an enlarged scale, of parts thereof. Fig. 4 is a plan view of the same. Fig. 5 is a rear elevation of the same.

My invention is particularly applicable to the tea or coffee pot described in the application for Letters Patent on an improved tea or coffee pot by Charles F. Smith and George E. Curtiss, Serial No. 470,171.

A is the body of my tea or coffee pot, B is the cover for the same, and C is a tea ball, all generally as described in the application mentioned. In this style of tea or coffee pot means are provided for maintaining the tea ball C in an elevated position, and in order that in such position it may be sufficiently elevated to clear the liquid level under all normal conditions of use, the general dome shape of the said cover is made more pronounced than usual in ordinary tea or coffee pots. The result of this is that the center of gravity of the combined cover and tea ball is higher than is usually the case with ordinary covers, which condition is aggravated by the fact that extra parts and consequently extra weight are provided in the cover knob, which also supports the weight of the protruding portion of the operating chain, with the operating knob pendent at the free end of the same. Briefly stated, the cover combined with the extra parts mentioned, is top heavy. The result is that when the tea or coffee pot is tipped, as in the ordinary act of pouring tea or coffee, a point is reached at which the cover with its attachments, tends to tip or fall over, the pivotal point in going over being the lower edge corresponding with the front edge under normal conditions, of the cover, bearing on the corresponding edge of the rim of the tea or coffee pot as a fulcrum, as best seen at 6, Fig. 2. As shown the said body A has a top provided with a neck 10 having a cylindrical interior, below which cylindrical interior the said body A flares inwardly, forming a shoulder 11, and the said cover B has at the bottom a downwardly projecting neck 12, having a cylindrical exterior fitting the cylindrical interior of said neck 10 on the top of the body, so that downward motion of the cover when in normal position on the top is limited by the said shoulder 11. This tendency for the cover to fall away as described may be entirely obviated by my invention, which involves the use of a back stop at the back edge of the cover B, comprising two elements, respectively a plate 7 having a finger 9 projecting backwardly from said edge, and rigidly attached thereto, adapted to engage an eye 8, rigidly mounted on the upper face of the rim of the body A. The said finger 9 bears against the walls of the eye 8 in case of any tendency of the cover to tip during pouring and resists all such tendency, so that the cover will be maintained in its normal position. In case the tipping is in a vertical plane the upper wall of said eye 8 resists such tendency, whereas if the tipping is sidewise, the side walls coöperate with the upper wall of said eye 8. While this arrangement insures the maintenance of the cover in its normal position at all inclinations possible in the normal use in the act of pouring tea or coffee, the said arrangement permits of ready disengagement for the purpose of removing the cover B with the tea ball from the pot. By first giving the cover B a slight backward tilt, the back edges of the plate 7 at the sides of the finger 9 bears against the eye 8 as a fulcrum, until the front edge of the cover B clears the top of the corresponding edge of the top of the body A, then a slight movement forward of the cover disengages the finger 9 from the eye 8 permitting the free removal of the said cover B.

My invention obviates the necessity of holding the cover in position by hand during the act of pouring tea or coffee, a condition more or less awkward, and does this without particularly interfering with the free removal of the cover as desired.

It is apparent that some changes from the specific construction herein disclosed may be made and therefore I do not wish to be understood as limiting myself to the precise form of construction shown and described, but desire the liberty to make such changes, in working my invention, as may fairly come within the spirit and scope of the same.

I claim as my invention:—

In a tea or coffee pot, an upwardly projecting cylindrical top having a front and back, and an inwardly projecting shoulder below said top, a dome shaped cover, a cylindrical neck projecting downwardly from said cover, fitting and adapted to be received within said cylindrical top, adapted to be supported by said shoulder when in normal position while brewing and storing tea or coffee and having a front and a back, a tea ball adapted to be housed within said dome shaped cover, the line of gravitation for the combined cover and tea ball housed therein being outside the supporting base of the same during the act of pouring tea or coffee so as to tend to tilt the said cover on its said front and separate the said backs of said cover and top, the said front of said cover adapted to engage with the said front of said top during said act of pouring tea or coffee and be supported thereby in coöperation with said shoulder, and means for preventing the said separating of said backs comprising a backwardly directed finger on said back of said cover adapted to engage with a laterally opening eye mounted on the top edge of the said back of said top.

GEORGE E. CURTISS.

Witnesses:
L. F. SCHLAICH,
C. H. DEMING.